United States Patent
Brown et al.

(10) Patent No.: US 9,471,499 B2
(45) Date of Patent: Oct. 18, 2016

(54) METADATA MANAGEMENT

(71) Applicant: GLOBALFOUNDRIES INC., Grand Cayman (KY)

(72) Inventors: Theresa M. Brown, Tucson, AZ (US); Mark L. Lipets, Tucson, AZ (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 764 days.

(21) Appl. No.: 13/898,255

(22) Filed: May 20, 2013

(65) Prior Publication Data

US 2014/0344526 A1 Nov. 20, 2014

(51) Int. Cl.
*G06F 12/00* (2006.01)
*G06F 11/14* (2006.01)
*G06F 12/08* (2016.01)

(52) U.S. Cl.
CPC ....... *G06F 12/0868* (2013.01); *G06F 11/1458* (2013.01); *G06F 11/1456* (2013.01)

(58) Field of Classification Search
CPC ........... G06F 12/0868; G06F 11/1456; G06F 11/1458
See application file for complete search history.

(56) References Cited

U.S. PATENT DOCUMENTS

| | | | |
|---|---|---|---|
| 2004/0267706 A1* | 12/2004 | Springer, Sr. | ........... G06F 3/061 |
| 2006/0106891 A1* | 5/2006 | Mahar | ............... G06F 17/30067 |
| 2006/0106971 A1* | 5/2006 | Mahar | ................... G06F 3/0605 |
| | | | 711/100 |
| 2013/0185493 A1* | 7/2013 | Benhase | ............... G06F 12/128 |
| | | | 711/105 |

OTHER PUBLICATIONS

"Bit Array", Wikipedia, [online][retrieved Apr. 17, 2013] en.wikipedia.org/wiki/Bit_array, pp. 1-7.

* cited by examiner

*Primary Examiner* — Aracelis Ruiz
(74) *Attorney, Agent, or Firm* — Anthony Canale; Hoffman Warnick LLC

(57) ABSTRACT

In one embodiment, a copy relationship is established between a storage location at a first site and a storage location at a second site, in a manner which includes selectively either 1) synchronously writing a modified metadata track from a cache to data storage if the metadata track in cache is a mixture of ones and zeros, before staging from data storage into the cache, the next track of the sequence of tracks of metadata, or 2) instead of synchronously writing from cache the modified metadata track, entering a journal entry to protect the modified metadata track in cache if the metadata track in cache is one of all ones and all zeros, so that asynchronous writing of the modified metadata track from cache is substituted for synchronous writing from cache. Other aspects are described.

20 Claims, 6 Drawing Sheets

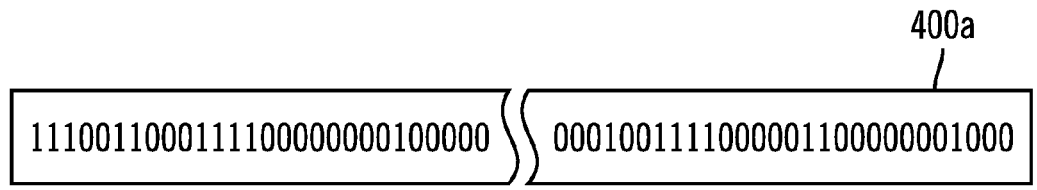
FIG. 4A
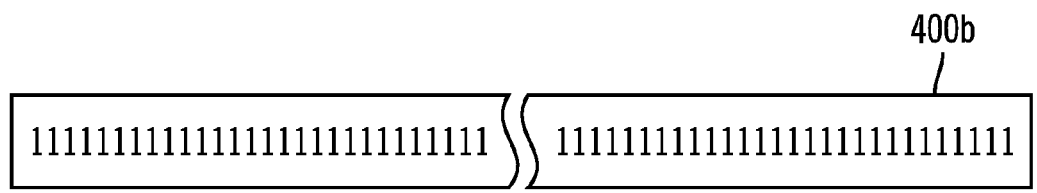
FIG. 4B
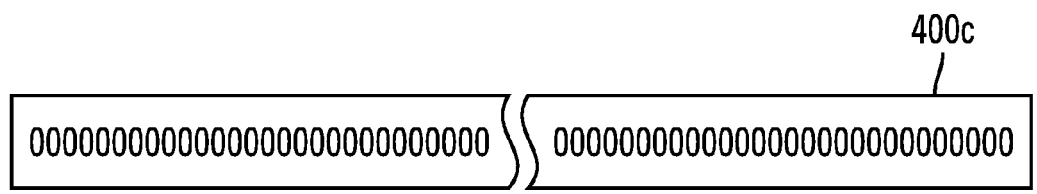
FIG. 4C
| BITMAP # | VOLUME # | TRACK # | TRACK CONTENTS |
|---|---|---|---|
|  |  |  |  |
|  |  |  |  |
|  |  |  |  |
|  |  |  |  |
FIG. 5

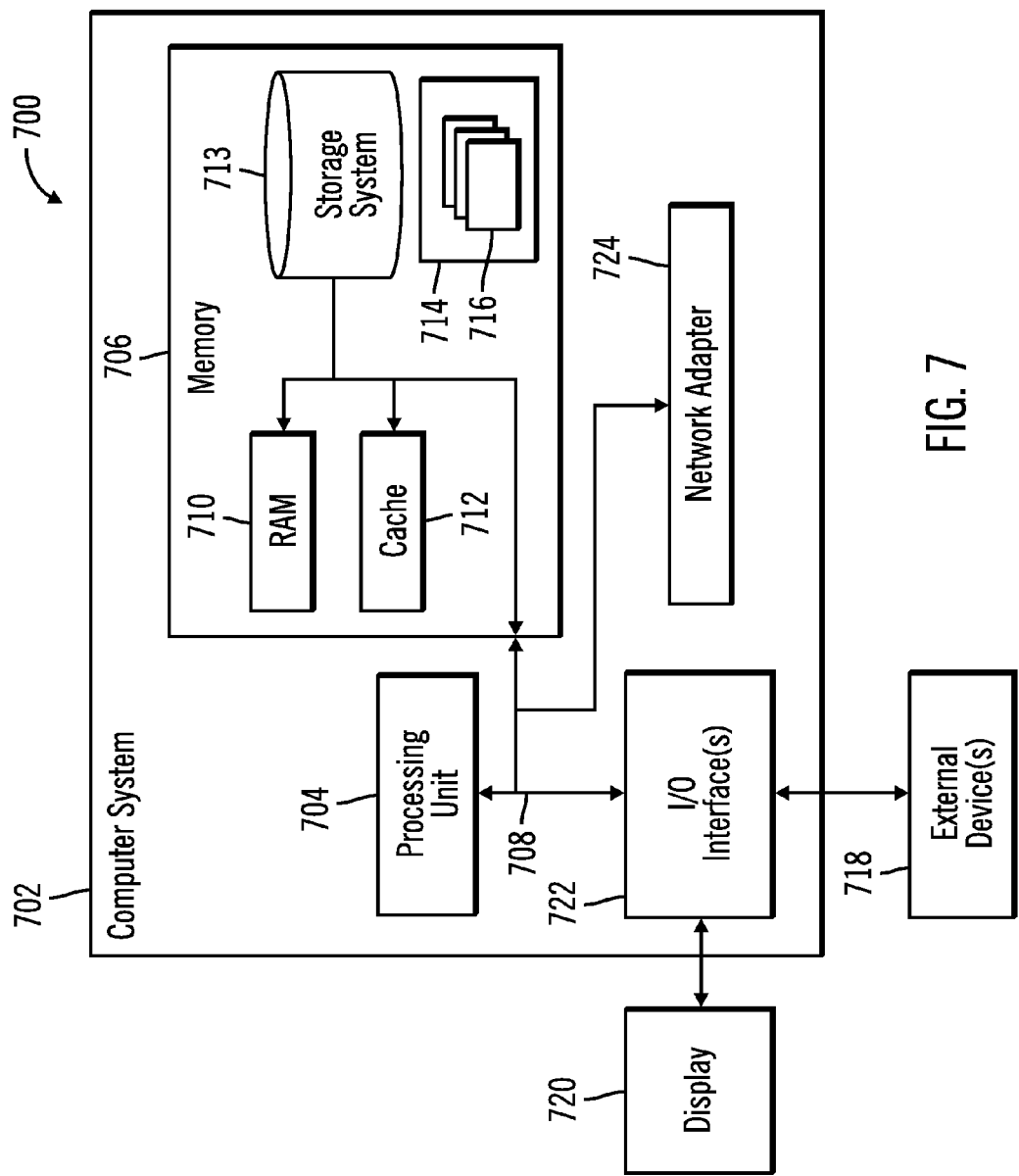

METADATA MANAGEMENT

BACKGROUND

1. Field of the Invention

The present invention relates to a method, system, and program for managing metadata for primary and secondary storage locations subject to a copy relationship.

2. Description of the Related Art

Data backup systems can provide continuous availability of production data in the event of a sudden catastrophic failure at a single point in time or data loss over a period of time. In one such system, production data is mirrored from a local site to a remote site which may be separated geographically by several miles from the local site. Such dual, mirror or shadow copies are typically made in a secondary storage device at the remote site, as the application system is writing new data to a primary storage device usually located at the local site. Different copy technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy.

In data mirroring systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship. Primary and secondary storage controllers may be used to control access to the primary and secondary storage devices.

In the International Business Machine Corporation's ("IBM") Global Mirror, data is asynchronously copied from the primary storage site to the secondary storage site. Data may be copied in consistency groups, such that the second copy at the secondary site is consistent as of a point-in-time to a first copy of the data at the primary site. In a consistency group, the order of dependent writes is preserved in the copying of the data.

The second copy, at the secondary site, may be copied to a target copy of the data at the secondary site using a point-in-time ("PiT") copy techniques, such as the IBM FlashCopy® (FlashCopy is a registered trademark of IBM). In this way the second copy at the secondary site becomes the source data for the PiT copy to the target copy which is typically on the same storage as the second copy.

Customers that want to create additional copies of the target data of the target copy at the secondary site, may perform a fast reverse restore operation, where replication from the primary to the secondary site is suspended and a reverse FlashCopy is made from the target copy back to the second copy, wiping out any newer data received at the second copy since the point-in-time of the Flashcopy. After the reverse FlashCopy is made back to the second data copy, the customer may then make additional copies from the reversed second data copy.

Copy services Flashcopy, frequently use various types of bitmaps stored in metadata. One such bitmap is the source bitmap and another is the target bitmap. For example, a target bitmap typically includes a bit for each track of the second copy in the secondary storage location that storage controllers are to copy over to a corresponding track of the target copy of the secondary storage location of a copy relationship. Thus, the target bitmap indicates a backlog of tracks waiting to be copied. The source bitmap is used when reversing a FlashCopy relationship. The source bitmap indicates a backlog of tracks to be copied from the target copy back to the second copy.

To update the bits of a bitmap, a metadata track of the bitmap stored in the storage may be staged into a cache, and bits of the bitmaps may be set or cleared as appropriate to indicate the status of write operations to be performed or to indicate write operations already completed, as appropriate. Once the track of the bitmap has been updated, it may be written to the data storage.

In the event that the bitmap metadata track in the cache might be lost due to a power failure or other failure event before it can be written to the storage, entries may be made in a journal to record the updates to the bitmap. Once a track of bitmap metadata is successfully written from cache to the storage, the corresponding entry in the journal may be discarded. However, should writing of the track of bitmap from cache fail, the updates to that track of bitmap metadata may be recovered from the corresponding entries of the journal and stored in the storage. The journal is frequently maintained in nonvolatile memory so that the data stored in the journal may be maintained notwithstanding losses in power.

In some systems, a command such as the IBM Establish Fast Reverse Restore (FRR) command may be used to reverse a local copy relationship so that the original target is now the source and the original source is now the target. All modified tracks on the original source volume since the last consistency group was achieved may be restored by copying back those tracks from the original target back to the original source.

The Establish FRR command further provides for inverted copying of the bits of the original target bitmap into the original source bitmap which becomes the new target bitmap. That is, the bits of the original target bitmap are inverted and the inverted bits are copied into the original source bitmap. This bitmap metadata processing is typically done sequentially on a track by track basis, for each track of the bitmaps in sequence. Thus, for each metadata track of a bitmap, a track of the original source bitmap is staged into cache, and the bits of the original target are inverted copied into the track of the original source bitmap. The original source bitmap track containing the inverted bits of the original target track is synchronously written from cache into storage. Each track containing the inverted bits is written synchronously with the sequential processing of the tracks of the bitmap. Thus, the inverted copy processing of the tracks of the bitmap is done on a track by track basis such that the track containing the inverted bits is written from cache before the next track in sequence of the bitmap is staged into cache for processing in the same manner.

SUMMARY

Provided are a method, system, and program for managing metadata for primary and secondary storage locations subject to a copy relationship. In one embodiment of the present description, a copy relationship is established between storage locations in a data storage system, in a manner which includes sequentially processing a plurality of tracks of metadata in sequence wherein synchronous writing of processed tracks from cache may be selectively avoided. In one embodiment, the sequential metadata processing includes for each metadata track: staging from data storage into a cache a track of the sequence of tracks of metadata, modifying the metadata track in cache, and before staging from data storage the next track of the sequence of tracks of metadata into the cache, selectively either 1), synchronously writing the modified metadata track from the cache to data storage if the metadata track in cache is a mixture of ones and zeros, or 2) instead of synchronously writing the modified metadata track from cache, entering a journal entry to protect the modified metadata track in cache if the metadata track is one of all ones or all zeros, so that synchronous writing of the modified metadata track from cache is omitted.

Other embodiments, aspects and features are described herein.

BRIEF DESCRIPTION OF THE DRAWINGS

FIGS. 4a-4c provide examples of sets of metadata for operations in accordance with one aspect of the present description.

FIG. 5 provides an example of a data structure of a journal for recording updates of tracks of metadata in accordance with one aspect of the present description.

FIG. 7 illustrates a computing environment in which embodiments may be implemented.

DETAILED DESCRIPTION

Figure 1:
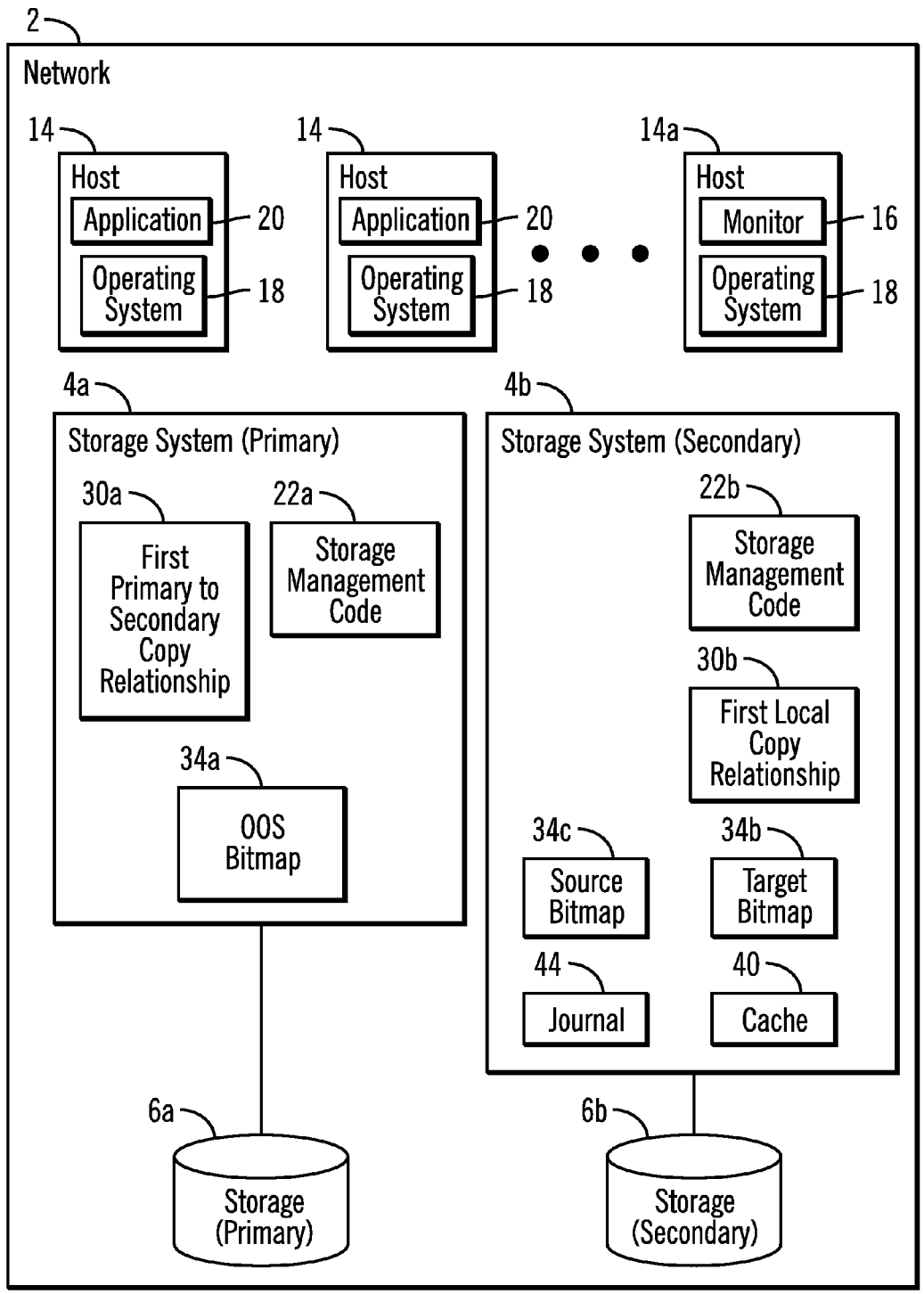
FIG. 1 illustrates an example of a network computing environment, in accordance with one embodiment of the present description.

FIG. 1 illustrates an embodiment of a network computing environment having a mirror or other copy relationship between storage locations in such a network computing environment or other data storage system. In one aspect of the present description, such a copy relationship may be established in a manner which includes sequentially processing a sequence of tracks of metadata wherein synchronous writing of a modified metadata track from cache may be omitted before staging the next track of the sequence of tracks of metadata into the cache to be processed. In one example, the sequential processing includes before staging from data storage the next track of the sequence of tracks of metadata into the cache, selectively either 1), synchronously writing a modified metadata track from cache to data storage if the metadata track is a mixture of ones and zeros, or 2) instead of synchronously writing the modified metadata track from cache, entering a journal entry to protect the modified metadata track in cache if the metadata track is one of all ones or all zeros, so that synchronous writing of the modified metadata track from cache is omitted.

As explained in greater detail below, it is believed that such an arrangement can reduce latency in processing of commands establishing a copy relationship. For example, asynchronous writing of tracks protected against data loss by the journal from cache may be substituted for synchronous writing of those tracks from cache. As a result, delay of completion of commands due to synchronous writing from cache may be reduced. Consequently, timeout conditions caused by commands taking an excessive amount of time to process may similarly be reduced or eliminated.

Although the embodiment of FIG. 1 is described in connection with a FlashCopy type copy relationship, it is believed that aspects of the present description are applicable to other types of copy relationships, depending upon the particular application. Additional features are discussed in the present description. It is appreciated that other features may be realized instead of or in addition to those discussed herein, depending upon the particular application.

In the illustrated embodiment, a copy relationship identifies a source storage location and a target storage location in which data stored at the source storage location is to be mirrored or otherwise copied to the target storage location. Thus, as used herein, a source storage location and a target storage location are storage locations related by a copy relationship.

Furthermore, as used herein, the term "storage location" refers to a storage location containing one or more units of data storage such as one or more volumes, cylinders, tracks, segments or any portion thereof, or other unit or units of data suitable for transfer. Thus, a source storage location and the target storage location may each be a storage volume. However, it is appreciated that a source storage location and a target storage location may each be of a size other than a volume, for example.

In the illustrated embodiment, a bitmap includes a bit for each track of a source storage location that storage controllers are to copy over to a corresponding target storage location of a copy relationship. Thus, the bitmap indicates a backlog of tracks waiting to be copied. During normal copy operations, any writes to a storage controller for the source storage location are recorded in the bitmap and then copied over to the target storage location. Although the bitmaps of the illustrated embodiment are described as representing a track with a bit, it is appreciated that one or more bits of a bitmap may represent other data portions or segments such as one or more blocks, pages, bytes, sectors, etc. as well as a plurality of tracks.

In the illustrated embodiment, a network 2 includes storage systems 4a, 4b, (also known as control units or storage controllers), and data storages 6a, 6b. The storage systems 4a, 4b, manage the copying of updates from a primary storage system to a secondary storage system. In the configuration illustrated in FIG. 1, the storage system 4a and the data storage 6a have been configured as a primary storage system and the primary storage, respectively. Similarly, the storage system 4b and its data storage 6b have been configured as a secondary storage system and a secondary storage, respectively. Hence, in the configuration depicted in FIG. 1, the storage system 4a will be referred to as a primary storage system 4a and the data storage 6a will be referred to as a primary storage 6a. Similarly, the storage system 4b will be referred to as a secondary storage system 4b and the data storage 6b will be referred to as a secondary data storage 6b. The storage systems and storages may be reconfigured to change the associated primary and secondary roles within a copy relationship.

The network 2 further includes one or more hosts 14 writing updates to the primary storage 6a. At least one such host 14, such as the host 14a, has in this embodiment, a monitor program 16 monitoring failures in the availability of the primary storage system 4a. In some embodiments, the monitor program 16 may be operated in a device apart from the hosts. The components 4a, 4b, 6a, 6b, and 14 are connected to the network 2 and the network 2 enables communication among these components. The network 2 may include one or more switches to provide one or more paths of communication between the different network 2 elements.

The primary storage system 4*a* is located at a first site and the secondary storage system 4*b* is located at a second site which may be geographically or functionally remote from the first site. Thus, in this example, the first site may be at a local site and the second site may be at a geographically remote site separated by a short or long geographical distance from the local site. Alternatively, the local and remote sites may be relatively close such as in different buildings in the same general geographical location, in different rooms of the same building, in different machines in the same room, or in different portions or partitions of the same machine, of the network 2.

A typical host 14 includes an operating system 18 and an application 20 that writes updates to the primary 6*a* or secondary 6*b* storage. The host 14*a* which includes the monitor program 16 may omit the update writing applications 20 in some embodiments. The primary 4*a* and secondary 4*b* storage systems include storage management software 22*a* and 22*b* to manage the data mirroring operations. The storage management software 22*a* accesses updates to the primary (first) storage 6*a* to write to the corresponding storage locations in the storage 6*b*. In some applications, the copying and relationship functions may be performed by devices external to the storage systems 4*a*, 4*b*, such as the hosts 14, for example.

A first copy relationship 30*a*, which may be maintained for the primary 4*a* and secondary 4*b* storage systems, associates primary storage locations such as primary storage volumes in the primary storage 6*a* and corresponding secondary storage locations such as secondary storage volumes in the secondary storage 6*b*, such that updates to the primary storage 6*a* volumes are copied to the corresponding secondary storage 6*b* volumes. The volumes of the primary storage 6*a* may be referred to as primary (or first copy) volumes containing source data to be copied to secondary (or second copy) volumes of the secondary storage 6*b* as target data. In some embodiments, the updates to the primary storage 6*a* volumes may be copied to the corresponding secondary storage 6*b* volumes before they are written to the primary storage 6*a*.

In the illustrated embodiment, the first primary to secondary copy relationship 30*a* comprises a peer-to-peer copy relationship for a pair of first copy and second copy storage volumes in which updates to the first copy primary storage volumes of the copy relationship 30*a* are mirrored to the second copy secondary storage volumes of the copy relationship 30*a*. It is appreciated that other types of copy relationships may be established, depending upon the particular application. The system 2 of the illustrated embodiment has another copy relationship 30*b* in which a second copy volume of the secondary storage 6*b* may be locally copied to a third copy volume of the secondary storage 6*b*. In this manner, the second copy volume of the secondary storage 6*b* is the source volume of the local copy relationship 30*b*, and the third copy volume of the secondary storage 6*b* is the target volume of the local copy relationship 30*b*. In the illustrated embodiment, the local copy relationship 30*b* is a point-in-time ("PiT") copy relationship, such as the IBM FlashCopy® (FlashCopy is a registered trademark of IBM). However, it is appreciated that metadata management in accordance with the present description may be applied to other types of copy relationships, depending upon the particular application.

In connection with the primary to secondary copy relationship 30*a*, updates to the primary storage volumes of the primary storage 6*a* are indicated as bits in a first bitmap 34*a*. Similarly, in connection with the local copy relationship 30*b*, updates to the source storage volumes for copying to the target storage volumes of the secondary storage 6*b* of the local copy relationship 30*b* are indicated as bits in a second bitmap 34*b*.

Each bit in the bitmap 34*a* is cleared as the storage management code 22*a*, 22*b* copies updates indicated in the bit in the bitmap 34*a* to the corresponding storage volumes of the secondary storage 6*b* of secondary storage system 4*b*. Similarly, each bit in the bitmap 34*b* is cleared as the storage management code 22*b* locally copies updates indicated in the bit in the bitmap 34*b* from the source storage volumes to the corresponding target storage volumes of the secondary storage 6*b* of secondary storage system 4*b*. Thus, the second bitmap 34*b* is referred to in FIG. 1 as the target bitmap of the local copy relationship 30*b*. Conversely, the first bitmap 34*a* is referred to in FIG. 1 as an Out Of Sync (OOS) bitmap 34*a* since the target volumes of the primary to secondary copy relationship 34*a* are the source volumes of the local copy relationship 30*b*.

To update the target bitmap 34*b*, a track of the bitmap 34*b* stored in the storage 6*b* may be staged into a cache 40, and bits of the bitmaps 34*b* may be set or cleared as appropriate to indicate the status of backlog tracks to be copied or to indicate copy has already completed, as appropriate. Once the track of the target bitmap 34*b* has been updated, it may be synchronously written to the data storage 6*b*. In the event that the bitmap metadata in the cache 40 might be lost before it can be synchronously written to the storage 6*b*, entries may be made in a journal 44 to record the updates to the target bitmap 34*b*. Once a track of bitmap metadata is successfully written from cache 40 to the storage 6*b*, the corresponding entry in the journal 44 may be discarded. However, should writing of the track of bitmap from cache fail, the updates to that track of bitmap metadata may be recovered from the corresponding entries of the journal 44 and stored in the storage 6*a*. The journal 44 is frequently maintained in nonvolatile memory so that the data stored in the journal 44 may be maintained notwithstanding losses in power.

The monitor program 16 may monitor the primary storage system 4*a* and upon detecting a failure event, may cause a failover operation to cause updates from the host 14 to be sent to the secondary storage system 4*b* instead of to the primary storage system 4*a*. If the system fails while updates to the primary storage 6*a* are being applied to the storage 6*b*, then the updates that did not complete being mirrored to the storage 6*b* can be recovered and applied to the storage 6*b*.

The storage management code 22*a*, 22*b* is invoked to establish a copy relationship such as the first copy relationship 30*a*, between first and second storage volumes in a first storage system and second storage system, respectively. The storage systems 4*a*, 4*b* may comprise enterprise storage servers, such as the IBM Enterprise Storage Server (ESS), for example.

The storage management code 22*a*, 22*b* managing the first copy relationship 30*a* may be implemented using synchronous copy operations, such as a peer-to-peer remote copy (PPRC) program. An example of a PPRC program is the IBM Geographically Dispersed Parallel Sysplex (GDPS)/PPRC copy program that enables the switching of updates to the primary storage 6*a* to the secondary storage 6*b*. The storage management code 22*a*, 22*b* may also implement asynchronous remote copy operations. An example of an asynchronous remote copy program is the IBM GDPS/XRC program where updates to the primary 6a or secondary 6b storage are mirrored to a corresponding volume in at a remote site. The described operations may be implemented with other programs such as other copy programs or other global recovery programs.

The network 2 may comprise a Storage Area Network (SAN), Local Area Network (LAN), Intranet, the Internet, Wide Area Network (WAN), peer-to-peer network, wireless network, arbitrated loop network, etc. The storages 6a, 6b may comprise an array of storage devices, such as a Just a Bunch of Disks (JBOD), Direct Access Storage Device (DASD), Redundant Array of Independent Disks (RAID) array, virtualization device, tape storage, flash memory, etc.

Figure 3:
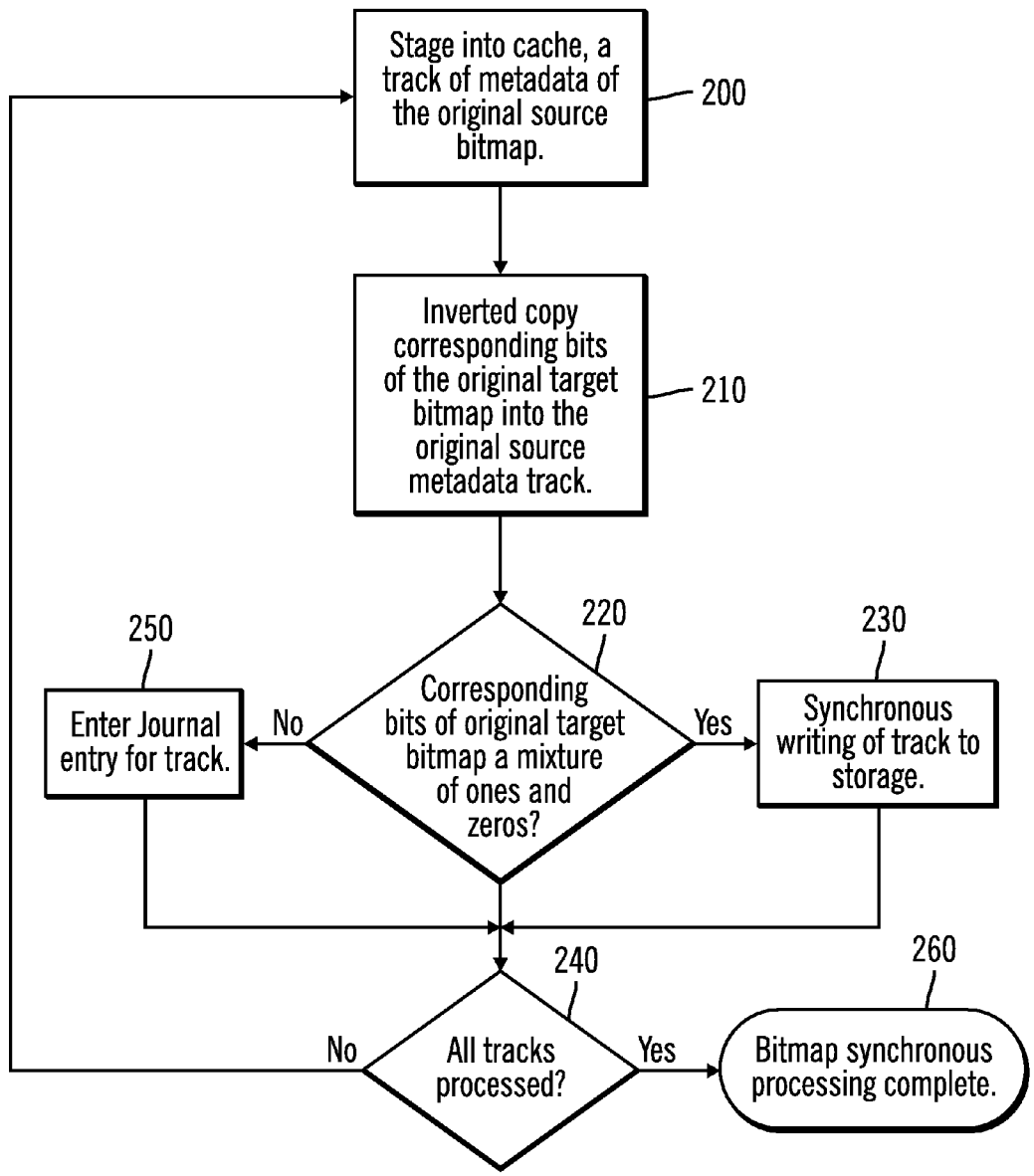
FIG. 3 illustrates an embodiment of metadata management operations in accordance with one aspect of the present description.

FIG. 3 illustrates one example of metadata management operations of a networked storage system in accordance with one embodiment of the present description, which may be initiated in response to, for example, detection of an error event at a primary storage system. The error event may comprise for example, a failure of the primary storage system 4a or a failure in the network 2 connection at the primary storage system 4a. The failure may be detected by the monitor component 16 for example.

In the example of FIG. 3, an error event at the primary storage system 4a is handled by creating a replacement copy relationship 30c (FIG. 2) in which the primary storage volumes of the failed or failing copy relationship are swapped to a different storage system such as the secondary storage system 4b. Thus, in response to the failure detection of the primary storage system of a first copy relationship, the establishment of a reverse primary to secondary copy relationship 30c (FIG. 2) is initiated to at least temporarily replace the first primary to secondary copy relationship 30a (FIG. 1).

As previously mentioned, Geographically Dispersed Parallel Sysplex (GDPS) is an example of a recovery application that customers may use to manage planned and unplanned outages. The GDPS recovery application can detect failures at the primary storage system which may be at a local site, for example. Such failures may include a problem writing or accessing the primary storage volumes at the local site. When the GDPS recovery application detects that a failure has occurred, it can invoke a swapping function referred to as the "HyperSwap" function. This function may be used to swap processing for all volumes in the mirrored configuration from the local site to the remote site. As a consequence of the swap, the storage volumes at the remote site which were originally configured as the secondary volumes of the original copy relationship, are reconfigured as the primary volumes of a new copy relationship. Similarly, the storage volumes at the local site which were originally configured as the primary volumes of the original copy relationship, are reconfigured as the secondary volumes of the new copy relationship, once the volumes at the local site are operational again.

In connection with the swapping function, a failover function may be invoked. In the GDPS recovery application, the failover function can in some instances, obviate performing a full copy when re-establishing data replication in the opposite direction, that is, from the remote site back to the local site. More specifically, the failover processing resets or reconfigures the remote storage devices (which were originally configured as the secondary storage devices) to be the primary storage devices which are placed in a "suspended" status pending resumption of the mirroring operation but in the opposite direction. In the meantime, after the failover processing starts any subsequent data updates made by the host to the remote site will be maintained in a bitmap.

Once the local site is operational, failback processing may be invoked to reset the storage devices at the local site (which were originally configured as the primary storage devices) to be the secondary storage devices. Mirroring may then be resumed (in the opposite direction, that is remote to local rather than local to remote) to resynchronize the secondary storage devices (originally the primary storage devices) at the local site to the data updates being stored at the primary storage devices (originally the secondary storage devices) at the remote site.

Thus, in the illustrated embodiment, upon detecting the failure, a failover is issued for the first copy relationship 30a (or some other action performed) to cause the host 14 to write further updates to the secondary storage 6b instead of primary storage 6a. The monitor code 16 may communicate to the storage management code 22a, 22b that the primary storage system 4a has failed or that first copy relationship 30a is suspended. Alternatively, the storage management code 22a, 22b may learn of the failure of the primary storage system 4a (or suspension of the first primary to secondary copy relationship 30a) before receiving indication from the monitor code 16 of such failure. The storage management code 22a, 22b indicates the first copy relationship 30a as suspended in response to determining that the first storage system 4a has a failure (either independently of the communication from the monitor 16 or in response to the communication).

Figure 2:
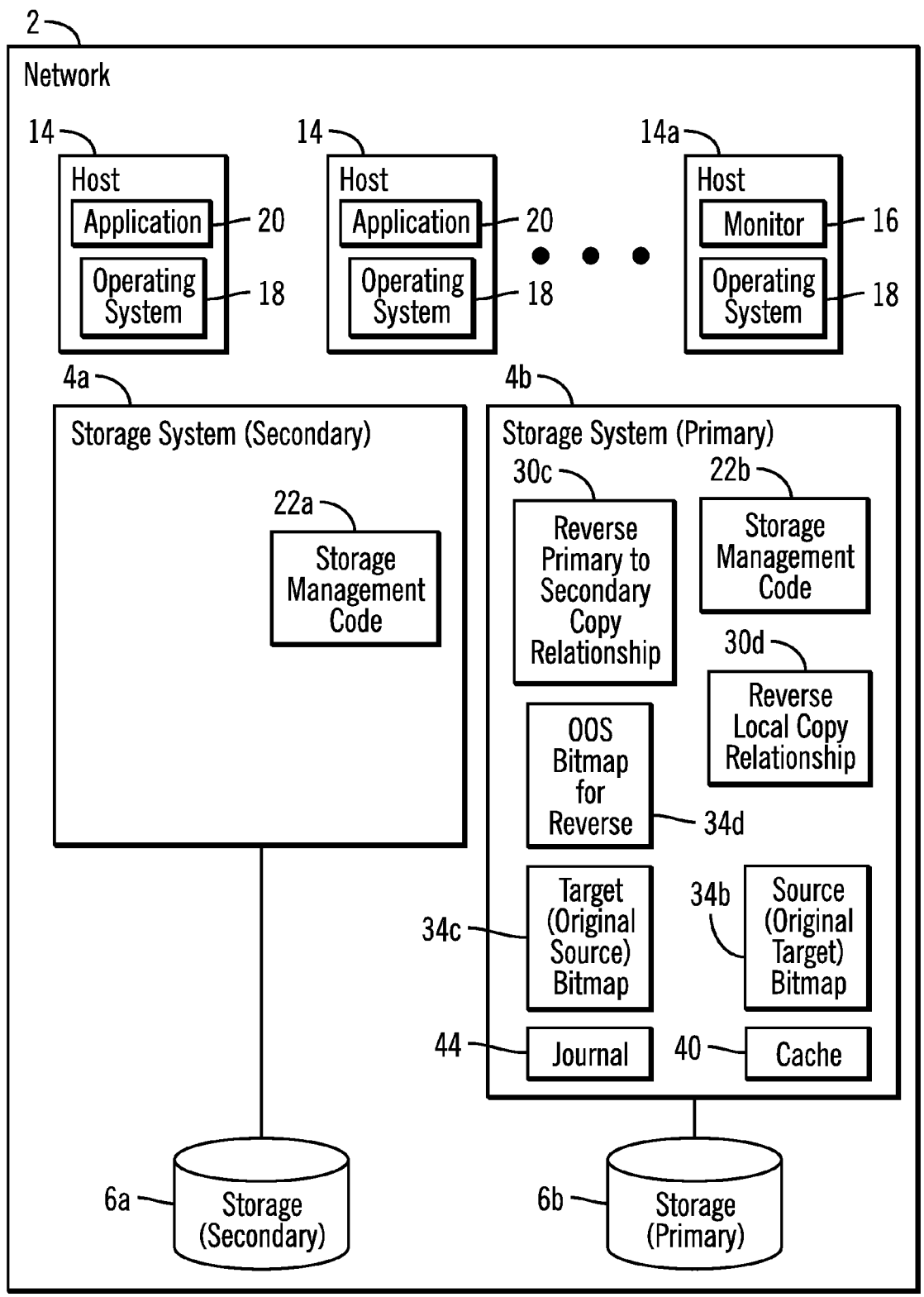
FIG. 2 illustrates the network computing environment of FIG. 1 having a second mirror or other copy relationship being established.

Accordingly, in the illustrated embodiment, in response to the failure detection of the primary storage system of a first copy relationship, the establishment of a reverse primary to secondary copy relationship 30c (FIG. 2) is initiated in which the primary storage of the copy relationship 30c is now the storage 6b (FIG. 2) at the remote site, and the secondary storage will be the storage 6a (FIG. 2) at the local site as indicated in FIG. 2. Once the reverse primary to secondary copy relationship 30c has been established, a bitmap such as bitmap 34d (FIG. 2) may be used by the reverse primary to secondary copy relationship 30c to record the updates to the storage volumes of the primary storage 6b (FIG. 2) at the remote site, that are to be mirrored back to the storage volumes of the secondary storage 6a (FIG. 2) at the local site, once the secondary storage system 4a and secondary storage 6a (FIG. 2) at the local site are operational again.

To prepare for the reverse primary to secondary copy relationship 30c, it may be appropriate to create one or more additional copies of the target data of the target volume of the local copy relationship 30b at the storage 6b. In one embodiment, such a copy operation is referred to as a reverse restore operation, where replication from the primary to the secondary site is suspended and a reverse FlashCopy is made from the target copy back to the second copy, wiping out any newer data received at the second copy since the point-in-time of the Flashcopy or last consistency group. Accordingly, another local copy relationship 30d is created in which the source volume of the original local copy relationship 30b becomes the target volume of the reverse local copy relationship 30d. Similarly, the target volume of the original local copy relationship 30b becomes the source volume of the reverse local copy relationship 30d.

After the reverse FlashCopy is made back to the second data copy, the customer may then make additional copies from the reversed second data copy. Although metadata management in accordance with the present description is described in connection with a reverse restore operation initiated in connection with a failure at the primary storage 6a, it is appreciated that such metadata management in accordance with the present description may be applied to other copy operations and to reverse restore operations in other scenarios which do not include a failure.

To establish the reverse local copy relationship 30d, in some embodiments, an IBM command such as the Establish Fast Reverse Restore (FRR) command may be used to reverse the source and target volumes so that the original source volume of the secondary storage 6b is now the target volume of the secondary storage 6b and the original target volume of the secondary storage 6b is now the source volume of the secondary storage 6b. In such an embodiment, all modified tracks on an original source volume of the secondary storage 6b since the last consistency group may be restored by copying back those tracks from the original target volume of the secondary storage 6b back to the original source volume of the secondary storage 6b. In addition, the original source bitmap 34c of the original local copy relationship 30b (FIG. 1) becomes the target bitmap 34c (FIG. 2) of the reverse local copy relationship 30d. To populate the target bitmap 34c, the bits of the original target bitmap 34b (FIG. 1) are inverted copied (that is, copied and inverted and the inverted bits are copied) into the original source bitmap 34c which becomes the target bitmap 34c (FIG. 2) of the reverse local copy relationship 30d.

As previously mentioned, in the original local copy relationship 30b, the updates to the source storage volume of the secondary storage 6b were indicated in corresponding bits of the target bitmap 34b (FIG. 1). Those bits of the bitmap 34b were cleared as the storage management code 22b copied updates indicated in the target bitmap 34b to the corresponding target volume of the secondary storage 6b of secondary storage system 4b. Accordingly, by inverted copying the target bitmap 34b of the original local copy relationship 30b, those bits of the target bitmap 34b which were previously reset to mark them as cleared and representing completed updates, are copied, inverted back, and stored in the original source bitmap 34c to set bits in the original source bitmap 34c to indicate tracks to be copied back to the original source volume, to restore to the original source volume (now the target volume of the reverse local copy relationship 30d), all modified tracks on the original source volume of the secondary storage 6b since the last consistency group. These bitmap operations may be performed during processing of an Establish FRR Command, for example. It is appreciated however, that other commands may be used to establish a copy relationship, depending upon the particular application.

The inverted copy bitmap operations may be performed sequentially, track by track of the sequence of tracks of the original source bitmap, until all bits of the original target bitmap 34b have been copied and inverted and stored in the original source bitmap 34a which is to be the target bitmap 34a of the reverse local copy relationship 30d. Previously, the track by track sequential processing included, for each metadata track of the original source bitmap, staging one metadata track of the original source bitmap into cache, inverted copying the corresponding bits of the original target bitmap into the metadata track of the original source bitmap, followed by writing the metadata track of the original source bitmap containing the inverted bits from cache to storage.

These bitmap track operations are typically performed sequentially, that is, a metadata track of the original source bitmap was not staged into cache until the processing of the prior metadata track of the original source bitmap track in sequence was concluded. Previously, such sequential processing included synchronous writing from cache to storage of each track containing the inverted bits. Accordingly, the next metadata track in sequence was not staged into cache until the prior metadata track in sequence and containing the inverted bits, was successfully written from cache. Thus, once a bitmap track had been successfully written to storage, the next bitmap track in sequence was staged into cache for processing.

It is appreciated that as the volumes become larger, the prior sequential track by track processing of the metadata tracks has correspondingly taken longer. For example, when a volume is created, tracks are typically allocated for metadata including data structures for bitmaps for copy services use. The number of these metadata tracks allocated for a particular primary storage volume will frequently depend on the size of the volume. For example, a primary storage volume such as a 1 terabyte (TB) volume, for example, may have millions of customer tracks. However, a track of a bitmap may represent as few as a few thousand customer tracks of storage. Thus, a storage volume may allocate several thousand bitmap metadata tracks. As a result, staging and writing from cache each track of the thousands of metadata tracks in sequence to write the inverted bits into all bit positions of a bitmap for a 1 TB volume, can be time consuming. Accordingly, in previous systems, a host may too frequently timeout waiting for the appropriate establish command to complete processing.

In the example of FIG. 3, a reverse local copy relationship may be established in a manner which includes sequentially processing a sequence of tracks of metadata wherein synchronous writing of a modified metadata track from cache may in some instances be omitted before staging the next track of the sequence of tracks of metadata into the cache to be processed. Thus, in a first operation, a track of metadata, such as a track of the metadata of the original source bitmap 34c, for example, may be staged (block 200) into cache such as the cache 40 of the storage system 4b. In the illustrated embodiment, a set of bits of the original target bitmap 34b corresponding to each track of the original source bitmap 34c may be read and buffered. Each set of original target bitmap bits corresponding to a track of original source bitmap bits has a bit position for each bit position of the corresponding original source bitmap. Thus, in the illustrated embodiment, each set of original target bitmap bits corresponding to a track of original source bitmap bits has the same number of bits as the corresponding track of the original source bitmap.

The track of the original source bitmap 34c staged in the cache may be modified (block 210) in cache. In the illustrated embodiment, the modification operation of block 210 is an inverted copy operation in which each metadata bit of the original target bitmap 34b is copied, inverted and the inverted bit is copied into the corresponding bit position of the corresponding track of the original source bitmap 34c which has been staged into cache as noted above. In accordance with the present description, a determination is made (block 220) as to whether the corresponding set of bits of metadata read from the original target bitmap include a mixture of ones and zeros. If it is determined (block 220) that the set of bits of the metadata track of the original target bitmap include a mixture of ones and zeros, as shown for the set of bits 400a of FIG. 4a, for example, the metadata track of the original source bitmap 34a containing the inverted bits of the metadata track of the original target bitmap 34b may be synchronously written (block 230) from cache. If all tracks of the sequence of tracks of the bitmap 34a have not been processed (block 240), the next track in sequence of the source bitmap 34a may be staged (block 200) into cache, and another set of corresponding bits of the original target bitmap 34b may be inverted copied (block 210) into the corresponding bit positions of the next metadata track of the original source bitmap 34a in the manner discussed above.

However, if it is determined (block 220) that the set of corresponding bits of the original target bitmap do not include a mixture of ones and zeros, but instead are all ones, as shown for the set of bits 400b of FIG. 4b, for example, or are all zeros, as shown for the set of bits 400c of FIG. 4c, for example, synchronous writing from cache of the metadata track of the original source bitmap 34a containing the inverted bits of the metadata track of the original target bitmap 34b may be bypassed. Instead, an entry in a journal such as the journal 44 (FIG. 2) may be entered (block 250) to provide a record indicating the contents of the metadata track in cache.

FIG. 5 shows an example of a data structure of a journal 500 which may be maintained in nonvolatile memory, for example, so that the data of the journal 500 may be accessed notwithstanding a power failure of the system, for example. It is appreciated that the journal 500 may be maintained in other types of memory, depending upon the particular application.

In the embodiment of FIG. 5, the journal 500 includes a field 510 designated as the "Volume #" to identify the particular original source volume (and now the target volume) of the storage system 4b to which it pertains. Another field 520 designated as the "Bitmap #" identifies the particular bitmap of the particular original source volume to which it pertains. Yet another field 530 designated "Track #" identifies the particular metadata track of the particular bitmap of the particular original source volume to which it pertains. A field 540 designated "Track Contents" indicates whether the contents of the particular metadata track was determined to be all ones or all zeros. For example, the field 540 can specify the range (as specified by start and end bit sequential numbers, for example). the value (which specifies whether all bits in the range are set (i.e. a "1") or reset (i.e. a "0"). It is appreciated that the contents of the track may be represented in other formats, depending upon the particular application. It is further appreciated that other fields may be included in addition to or instead of those indicated. For example, in those applications in which metadata processing for establishing a copy relationship involves only a single type of bitmap, the bitmap identification field 520 may be omitted.

If it is determined (block 240) that all tracks of the bitmap have not yet been processed, the next track in sequence of the sequence of tracks of the bitmap may be staged (block 200) in cache and processed (blocks 210-250) as discussed above. In many applications, a journal entry (block 250) may be made in nonvolatile memory more quickly than a track of metadata can be synchronously written (block 230) from cache into storage. As a consequence, it is believed that in some applications, overall processing of a sequence of tracks of metadata may therefore be performed more quickly since not all tracks of the sequence of tracks of the bitmap are synchronously written.

Once all tracks of the bitmap have been sequentially processed (blocks 200-250), the bitmap track sequential processing portion of the establish command is complete (block 260). As a result, the bitmap inverted copy operation of the establish command may be processed more quickly, reducing or eliminating time outs caused by the establish command not completing before the predetermined time out period expires.

For those processed bitmap tracks, the contents of which are protected by a recording (block 250) in an entry of the journal 44 instead of being synchronously written (block 230), the bitmap tracks may be asynchronously written from cache at any suitable time. For example, bitmap tracks which have been journal protected in this manner, may be asynchronously written as opportunities arise. For example, some or all journal protected bitmap tracks may be asynchronously written in parallel with the synchronous processing of the remaining tracks of the bitmap, as resources of the system permit. Hence, journal protected bitmap tracks may be asynchronously written after one or more of the next tracks of the bitmap of the sequence of bitmap tracks has been staged (block 200) in cache and processed (blocks 210-250) as discussed above. Should the data in cache be lost before the asynchronous writing from cache is completed, the tracks may nonetheless be written into storage since the contents were previously recorded in the journal.

In some embodiments, the establish command may be deemed to be completed before all journal protected tracks have been asynchronously written. Hence, some or all journal protected bitmap tracks may be asynchronously written after all tracks of the sequence of tracks of the bitmap have been processed (block 200-250) in sequence, and the two bitmaps inverted copy operation portion of the establish command is complete (block 260). Thus, the establish command may be reported to be complete, thereby avoiding a timeout condition, notwithstanding that some or all of the journal protected bitmap tracks have not yet been asynchronously written. In the event of a power failure or other loss of data in the cache prior to successful writing from cache of all journal protected bitmap tracks, those journal protected bitmap tracks which were not asynchronously written from cache prior to the data loss in cache may be reconstructed using the data of the journal 44b in nonvolatile memory, and written to storage.

In the illustrated embodiment, a journal entry representing a track may be made relatively compactly as shown in FIG. 5, for example. Moreover, the number of journal entries may be reduced by selectively creating journal entries for certain classes of tracks of metadata such as those that contain all one's or all zero's, for example, as described above. As a result, the size of the nonvolatile memory containing the journal entries may be reduced. It is believed that creating a journal entry for every track of metadata may be impractical in some applications due to the large number of metadata tracks of a typical bitmap and the relatively limited size of the typical nonvolatile memory. Once, the journal is full such that no additional journal entries may be made, synchronous writing from cache would resume for all tracks. Accordingly, it is believed that by selectively creating compact journal entries, synchronous writing from cache may be successfully bypassed for many tracks of a bitmap without the journal entries exceeding the size of the nonvolatile memory. Although the illustrated embodiment depicts bitmap management operations in connection with a copy relationship for volumes in the same storage unit, it is appreciated that bitmap management operations such as the bitmap merge operation described herein may be applied to bitmap management operations for a copy relationship for volumes that may reside at different sites remote from each other.

Figure 6:
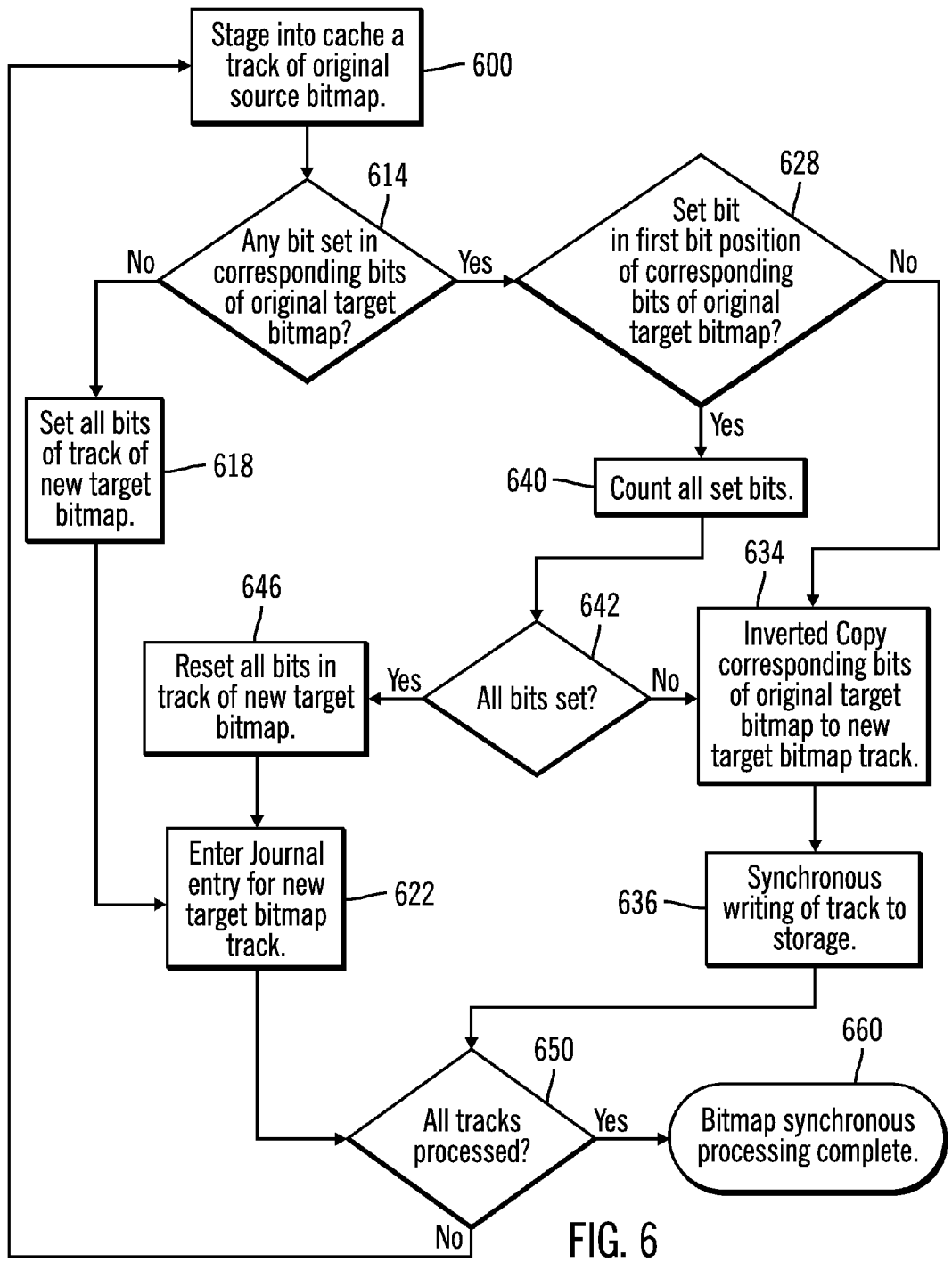
FIG. 6 illustrates another embodiment of metadata management operations in accordance with one aspect of the present description.

FIG. 6 depicts another example of bitmap management in accordance with one embodiment of the present description.

In the example of FIG. 6, a reverse restore copy relationship may be established in a manner similar to that of FIG. 3, which includes sequentially processing a sequence of tracks of metadata wherein synchronous writing of a modified metadata track from cache may be omitted before staging the next track of the sequence of tracks of metadata into the cache to be processed. Thus, in a first operation, bits of metadata, such as a set of bits of the original target bitmap 34b, for example, may be read and buffered, and the corresponding track of the original source bitmap 34a containing the corresponding bits is staged (block 600) into cache such as the cache 40. The track of the original source bitmap 34c staged in the cache may then be modified in cache. In the illustrated embodiment, the modification operation is an inverted copy operation in which each bit of the set of bits of the original target bitmap 34b is copied, inverted and copied into the corresponding track of the original source bitmap 34c which has been staged into cache as noted above. However, it is appreciated that other bit processing operations may be performed, depending upon the particular application.

In accordance with the present description, a determination is made (block 614) as to whether any bit has been set in the corresponding set of bits of the original target bitmap. If it is determined (block 614) that no bit has been set to "one" in the track of the original target bitmap (such that the bits of the track are all reset (all zeros)), the bit inverted copy process may be performed by setting (block 618) all bits of the track of the new target bitmap which was the original source bitmap 34c. In addition, synchronous writing from cache of the metadata track of the new target bitmap 34c containing the inverted bits of the metadata track of the original target bitmap 34b may be bypassed. Instead, an entry in a journal such as the journal 44 (FIG. 2) may be entered (block 622) to provide a record indicating the contents of the metadata track in cache.

Conversely, if it is determined (block 614) that a bit has been set to "one" in the track of the original target bitmap, it may be determined (block 628) as to whether the bit set to "one" is in the first bit position of the corresponding set of bits of the original target bitmap. If it is determined (block 628) that the bit set to "one" is not in the first bit position of the track, it is deemed that the bits of the corresponding set of bits of the original target bitmap are a mixture of ones and zeros, as shown for the set of bits 400a of FIG. 4a, for example. As a result, the bits of the set of bits of the original target bitmap 34b, now the new source bitmap, may be copied and inverted (block 634) into the corresponding track of the original source bitmap 34c, now the new target bitmap. Thus, the metadata track of the new target bitmap 34c containing the inverted bits of the set of bits of the original target bitmap 34b may be synchronously written (block 636) from cache to storage.

However, if it is determined (block 614) that a bit has been set to "one" in the corresponding set of bits of the original target bitmap, and it is determined (block 628) that the bit set to "one" is in the first bit position of the corresponding set, a count (block 640) is made of all the bits set to "one" in the set of bits. If it is determined (block 642) that all the bits of the track of the original target bitmap have been set to "one", the bit inverted copy process may be performed by resetting (block 646) to "zero" all bits of the track of the new target bitmap 34c in cache which was the original source bitmap. In addition, synchronous writing from cache of the metadata track of the original source bitmap 34c containing the inverted bits of the metadata track of the original target bitmap 34b may be bypassed. Instead, an entry in a journal such as the journal 44b (FIG. 2) may be entered (block 622) to provide a record indicating the contents of the metadata track in cache.

If it is determined (block 650) that all tracks of the sequence of tracks of the bitmap have not yet been processed, the next track of the sequence of bitmap tracks of the original source bitmap may be staged (block 600) in cache and processed (blocks 614-650) as discussed above. Once all tracks of the sequence of tracks of the bitmap have been sequentially processed (block 600-650), the two bitmaps inverted copy operation of the establish command is complete (block 660). As a result, the establish command may be processed more quickly in various applications, reducing or eliminating time outs caused by the establish command not completing before the predetermined time out period expires.

For those processed and journal protected bitmap tracks, the contents of which are recorded in the journal 44 instead of synchronously written from cache, the journal protected bitmap tracks may be asynchronously written from cache at any suitable time. Thus, completion of the establish command need not await the completion of the asynchronous writing from cache of the journal protected tracks of the bitmap.

In the examples of FIGS. 3 and 6, the modification of the bits of the track of the bitmap is described as an inverted copying inverting process. It is appreciated that metadata management operations in accordance with the present description may be applied to other types of metadata other than bitmaps. It is further appreciated that metadata management operations in accordance with the present description may be applied to other bit processing operations other than inverted copying operations such as other logical functions applied to bits such as logical OR, NOR, AND, NAND, Exclusive-OR etc. functions, depending upon the particular application.

It is seen from the above that metadata management may provide, in accordance with one embodiment of the present description, sequential processing of a sequence of tracks in which the sequential track by track processing includes before staging from data storage the next track of the sequence of tracks of metadata into the cache, selectively either 1) synchronously writing a modified metadata track from a cache to data storage if the metadata track is a mixture of ones and zeros, or 2) instead of synchronously writing the modified metadata track from cache, entering a journal entry representing the modified metadata track in cache if the metadata track is one of all ones or all zeros, so that synchronous writing of the modified metadata track from cache is omitted. It is believed that such an arrangement can reduce latency in processing of commands establishing a copy relationship. For example, asynchronous writing from cache of journal protected tracks may be substituted for synchronous writing from cache of those journal protected tracks. As a result, delay of completion of commands due to delays caused by synchronous writing from cache may be reduced. Consequently, timeout conditions caused by commands taking too long to process may similarly be reduced or eliminated.

FIG. 7 illustrates an embodiment of a computer node 702 of a computer system which may comprise an implementation of the metadata management systems of the present description. Computer node 702 is only one example of a suitable computing node and is not intended to suggest any limitation as to the scope of use or functionality of embodiments of the invention described herein. Regardless, computer node 702 is capable of being implemented and/or performing any of the functionality set forth hereinabove.

The computer node 702 is operational with numerous other general purpose or special purpose computing system environments or configurations. Examples of well-known computing systems, environments, and/or configurations that may be suitable for use with computer node 702 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 702 may be described in the general context of computer system executable instructions, such as program modules, being executed by a computer system. Generally, program modules may include routines, programs, objects, components, logic, data structures, and so on that perform particular tasks or implement particular abstract data types. Computer node 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 702 is shown in the form of a general-purpose computing device. The components of computer system/server 702 may include, but are not limited to, one or more processors or processing units 704, a system memory 706, and a bus 708 that couples various system components including system memory 706 to processor 704.

Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 702 typically includes a variety of computer system readable media. Such media may be any available media that is accessible by computer node 702, and it includes both volatile and non-volatile media, removable and non-removable media, and may be used for storing the programs and data used by the programs.

System memory 706 can include computer system readable media in the form of volatile memory, such as random access memory (RAM) 710 and/or cache memory 712. Computer node 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 716 generally carry out the functions and/or methodologies of embodiments of the invention as described herein, such as the operations of the metadata management.

Computer node 702 may also communicate with one or more external devices 718 such as a keyboard, a pointing device, a display 720, etc.; one or more devices that enable a user to interact with the computer node 702; and/or any devices (e.g., network card, modem, etc.) that enable computer system/server 702 to communicate with one or more other computing devices. Such communication can occur via Input/Output (I/O) interfaces 722. Still yet, computer node 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the invention to the precise form disclosed. Many modifications and variations are possible in light of the above teaching. It is intended that the scope be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
sequentially processing a plurality of tracks of metadata in sequence wherein each metadata track is metadata for a plurality of tracks of a source volume wherein the sequential metadata processing includes for each metadata track:
staging from data storage into a cache, a track of the sequence of tracks of metadata;
modifying the metadata track in cache; and
before staging from data storage the next track of the sequence of tracks of metadata into the cache, selectively either 1) synchronously writing the modified metadata track from the cache to data storage if the metadata track in cache is a mixture of ones and zeros, or 2) instead of synchronously writing from cache the modified metadata track, entering a journal entry to protect the modified metadata track in cache if the metadata track in cache is one of all ones and all zeros, so that synchronous writing of the modified metadata track from cache is omitted.

2. The method of claim 1 wherein the sequential metadata processing of the plurality of tracks of metadata in sequence, further includes staging the next track of the sequence of tracks of metadata into cache after entering the journal entry to protect the previously modified metadata track in cache so that synchronous writing of the previously modified metadata track from cache is omitted if the previously modified metadata track in cache is one of all ones and all zeros.

3. The method of claim 2 further comprising asynchronously writing from cache a modified metadata track protected by a journal entry during asynchronous writing from cache in which the modified track of metadata protected by a journal entry is written from cache sometime after the next track of the sequence of tracks of metadata has already been staged into cache for processing.

4. The method of claim 2 wherein the modifying of the metadata track in cache includes inverted copying the bits of a track of metadata into the metadata track in cache.

5. The method of claim 1 wherein the journal entry protecting the modified metadata track in cache identifies whether the modified metadata track in cache is one of all ones or is one of all zeros.

6. The method of claim 1 wherein the tracks of metadata define a first bitmap, wherein each bit of the bitmap represents a track of data storage.

7. The method of claim 6 further comprising establishing a first local copy relationship between a first volume as a source volume at a local location and a second volume as a target volume at the local location, wherein said establishing includes creating a first target bitmap wherein each bit of the first target bitmap represents a track of data of the first volume, receiving a reverse restore command to restore data on the first volume using data from the second volume, and in response, establishing a second copy relationship between the first volume as a target volume at the local location and the second volume as a source volume at the local location, wherein said second copy relationship establishing includes designating a second target bitmap wherein each bit of the second target bitmap represents a track of data of the second volume wherein the modifying of the metadata track in cache includes processing bits of the second target bitmap in response to the reverse restore command as a function of bits of the first target bitmap.

8. The method of claim 7 wherein the staging from data storage into a cache, a track of the sequence of tracks of metadata includes staging from data storage into the cache, a track of the second target bitmap; wherein the processing bits of the second target bitmap as a function of bits of the first target bitmap includes copy inverting the bits of the track of the first target bitmap into the track of the second target bitmap in cache; wherein the synchronously writing the modified metadata track from the cache to data storage includes synchronously writing from the cache the second target bitmap track having the copy inverted bits to data storage if the first target bitmap track is a mixture of ones and zeros; and wherein entering a journal entry to protect the modified metadata track in cache instead of synchronously writing from cache the modified metadata track includes entering a journal entry to protect the second target bitmap track in cache if the first target bitmap track is one of all ones and all zeros.

9. The method of claim 8 further comprising sending a response to the reverse restore command, after completion of the sequential metadata processing of the sequence of tracks of the second target bitmap, including completion of synchronous writing of tracks of the second target bitmap from the cache and before completion of asynchronous writing of tracks of the second target bitmap from cache.

10. A computer program product for a storage system having a plurality of volumes, a cache, and a journal, the computer program product comprising a non-transitory computer readable storage medium having computer readable program code embodied therein for execution by a processor of the storage system to perform operations, the operations comprising:
sequentially processing a plurality of tracks of metadata in sequence wherein each metadata track is metadata for a plurality of tracks of a source volume wherein the sequential metadata processing includes for each metadata track:
staging from data storage into a cache, a track of the sequence of tracks of metadata;
modifying the metadata track in cache; and
before staging from data storage the next track of the sequence of tracks of metadata into the cache, selectively either 1) synchronously writing the modified metadata track from the cache to data storage if the metadata track in cache is a mixture of ones and zeros, or 2) instead of synchronously writing from cache the modified metadata track, entering a journal entry to protect the modified metadata track in cache if the metadata track in cache is one of all ones and all zeros, so that synchronous writing of the modified metadata track from cache is omitted.

11. The computer program of claim 10 wherein the sequential metadata processing of the plurality of tracks of metadata in sequence, further includes staging the next track of the sequence of tracks of metadata into cache after entering the journal entry protecting the previously modified metadata track in cache so that synchronous writing of the previously modified metadata track from cache is omitted if the previously modified metadata track in cache is one of all ones and all zeros.

12. The computer program of claim 11 wherein the operations further comprise asynchronously writing from cache a modified metadata track protected by a journal entry during asynchronous writing from cache in which the modified track of metadata protected by a journal entry is written from cache sometime after the next track of the sequence of tracks of metadata has already been staged into cache for processing.

13. The computer program of claim 11 wherein the modifying of the metadata track in cache includes inverted copying the bits of a track of metadata into the metadata track in cache.

14. The computer program of claim 10 wherein the journal entry protecting the modified metadata track in cache identifies whether the modified metadata track in cache is one of all ones or is one of all zeros.

15. The computer program of claim 10 wherein the tracks of metadata define a first bitmap, wherein each bit of the bitmap represents a track of data storage.

16. The computer program of claim 15 wherein the operations further comprise establishing a first local copy relationship between a first volume as a source volume at a local location and a second volume as a target volume at the local location, wherein said establishing includes creating a first target bitmap wherein each bit of the first target bitmap represents a track of data of the first volume, receiving a reverse restore command to restore data on the first volume using data from the second volume, and in response, establishing a second copy relationship between the first volume as a target volume at the local location and the second volume as a source volume at the local location, wherein said second copy relationship establishing includes designating a second target bitmap wherein each bit of the second target bitmap represents a track of data of the second volume wherein the modifying of the metadata track in cache includes processing bits of the second target bitmap in response to the reverse restore command as a function of bits of the first target bitmap.

17. The computer program of claim 16 wherein the staging from data storage into a cache, a track of the sequence of tracks of metadata includes staging from data storage into the cache, a track of the second target bitmap; wherein the processing bits of the second target bitmap as a function of bits of the first target bitmap includes copy inverting the bits of the track of the first target bitmap into the track of the second target bitmap in cache; wherein the synchronously writing the modified metadata track from the cache to data storage includes synchronously writing from the cache the second target bitmap track having the copy inverted bits to data storage if the first target bitmap track is a mixture of ones and zeros; and wherein the entering a journal entry protecting the modified metadata track in cache instead of synchronously writing from cache the modified metadata track includes entering a journal entry to protect the second target bitmap track in cache if the first target bitmap track is one of all ones and all zeros.

18. The computer program of claim 17 wherein the operations further comprise sending a response to the reverse restore command, after completion of the sequential metadata processing of the sequence of tracks of the second target bitmap, including completion of synchronous writing of tracks of the second target bitmap from the cache and before completion of asynchronous writing of tracks of the second target bitmap from cache.

19. The computer program of claim 10 wherein the sequential metadata processing of the plurality of tracks of metadata in sequence, further includes staging the next track of the sequence of tracks of metadata into cache after entering the journal entry to protect the previously modified metadata track in cache so that synchronous writing from cache of the previously modified metadata track in cache is omitted if the previously modified metadata track in cache is one of all ones and all zeros;
wherein the journal entry protecting the modified metadata track in cache identifies whether the modified metadata track in cache is one of all ones or is one of all zeros, wherein the tracks of metadata define a first bitmap, wherein each bit of the bitmap represents a track of data storage, wherein the operations further comprise asynchronously writing from cache a modified metadata track protected by a journal entry during asynchronous writing from cache in which the modified track of metadata protected by a journal entry is written from cache sometime after the next track of the sequence of tracks of metadata has already been staged into cache for processing, wherein the modifying of the metadata track in cache includes inverted copying the bits of a track of metadata into the metadata track in cache, wherein the operations further comprise establishing a first local copy relationship between a first volume as a source volume at a local location and a second volume as a target volume at the local location, wherein said establishing includes creating a first target bitmap wherein each bit of the first target bitmap represents a track of data of the first volume, receiving a reverse restore command to restore data on the first volume using data from the second volume, and in response, establishing a second copy relationship between the first volume as a target volume at the local location and the second volume as a source volume at the local location, wherein said second copy relationship establishing includes designating a second target bitmap wherein each bit of the second target bitmap represents a track of data of the second volume wherein the modifying of the metadata track in cache includes processing bits of the second target bitmap in response to the reverse restore command as a function of bits of the first target bitmap, wherein the staging from data storage into a cache, a track of the sequence of tracks of metadata includes staging from data storage into the cache, a track of the second target bitmap; wherein the processing bits of the second target bitmap as a function of bits of the first target bitmap includes copy inverting the bits of the track of the first target bitmap into the track of the second target bitmap in cache; wherein the synchronously writing the modified metadata track from the cache to data storage includes synchronously writing from the cache the second target bitmap track having the copy inverted bits to data storage if the first target bitmap track is a mixture of ones and zeros; and wherein the entering a journal entry protecting the modified metadata track in cache instead of synchronously writing from cache the modified metadata track includes entering a journal entry to protect the second target bitmap track in cache if the first target bitmap track is one of all ones and all zeros, and wherein the operations further comprise sending a response to the reverse restore command, after completion of the sequential metadata processing of the sequence of tracks of the second target bitmap, including completion of synchronous writing of tracks of the second target bitmap from the cache and before completion of asynchronous writing of tracks of the second target bitmap from cache.

20. A storage system, comprising:
a processor;
a plurality of volumes of data storage;

a cache;
non-volatile memory adapted to store data structures including a journal; and
a computer program product comprising a computer readable storage medium having computer readable program code embodied therein for execution by the processor of the storage system to perform operations, the operations comprising:
sequentially processing a plurality of tracks of metadata in sequence wherein each
metadata track is metadata for a plurality of tracks of a source volume wherein the sequential metadata processing includes for each metadata track:
   staging from data storage into the cache, a track of the sequence of tracks of metadata;
   modifying the metadata track in cache; and
   before staging from data storage the next track of the sequence of tracks of metadata into the cache, selectively either 1) synchronously writing the modified metadata track from the cache to data storage if the metadata track in cache is a mixture of ones and zeros, or 2) instead of synchronously writing from cache the modified metadata track, entering a journal entry to protect the modified metadata track in cache if the metadata track in cache is one of all ones and all zeros, so that synchronous writing of the modified metadata track from cache is omitted.

* * * * *